(12) United States Patent
Hk et al.

(10) Patent No.: US 8,849,619 B2
(45) Date of Patent: Sep. 30, 2014

(54) SYSTEM AND METHOD FOR GENERATING THREE DIMENSIONAL FUNCTIONAL SPACE RESERVATION SYSTEMS OF A VEHICLE USING DELTA STORAGE

(75) Inventors: Anurag Sharma Hk, Bangalore (IN); Kannan Thirumalai, Tamilinadu (IN); Srinivasan Bhaskaran, Bangalore (IN); Varun Natarajan, Bangalore (IN); Hariprasad Reddy, Bangalore (IN); Sayantan Ghati, Bangalore (IN)

(73) Assignee: Airbus Engineering Centre India, Bangalore, Karnataka (IN)

( * ) Notice: Subject to any disclaimer, the term of this patent is extended or adjusted under 35 U.S.C. 154(b) by 377 days.

(21) Appl. No.: 13/288,050

(22) Filed: Nov. 3, 2011

(65) Prior Publication Data
US 2012/0116727 A1    May 10, 2012

(30) Foreign Application Priority Data
Nov. 9, 2010    (IN) .............. 3343/CHE/2010

(51) Int. Cl.
*G06F 17/50* (2006.01)
(52) U.S. Cl.
CPC ........ *G06F 17/5095* (2013.01); *G06F 2217/36* (2013.01); *G06F 2217/46* (2013.01); *G06F 2217/34* (2013.01); *G06F 17/5077* (2013.01)
USPC .......................................................... 703/1
(58) Field of Classification Search
None
See application file for complete search history.

(56) References Cited

U.S. PATENT DOCUMENTS

| | | | |
|---|---|---|---|
| 6,725,184 B1 | 4/2004 | Gadh et al. | |
| 2002/0026296 A1 * | 2/2002 | Lohmann et al. | 703/1 |
| 2003/0083767 A1 * | 5/2003 | Karlsberg | 700/103 |
| 2005/0080502 A1 * | 4/2005 | Chernyak et al. | 700/97 |
| 2005/0209830 A1 * | 9/2005 | Lee et al. | 703/1 |
| 2007/0233433 A1 | 10/2007 | Lee et al. | |
| 2008/0140242 A1 * | 6/2008 | Whitmer | 700/98 |

FOREIGN PATENT DOCUMENTS

WO    02/073473    9/2002

* cited by examiner

*Primary Examiner* — Omar Fernandez Rivas
*Assistant Examiner* — Bernard E Cothran
(74) *Attorney, Agent, or Firm* — Prakash Nama; Global IP Services, PLLC

(57) ABSTRACT

A system and method for generating three dimensional functional space reservation systems of a vehicle from a conceptual space reservation is disclosed. In one embodiment, in a method for generating three dimensional functional space reservation systems, functional, connectivity and geometrical information associated with two conceptual space reservation versions of the vehicle is collected from design databases. The two conceptual space reservation versions include current and previous conceptual space reservation versions. Then, mathematical models are created in organized binary form. Delta information detected from the two conceptual space reservation versions of the vehicle is outputted. Further, a set of rules and checks is applied in the mathematical model of the current conceptual space reservation version and standardized entities information is outputted. A set of functional attributes is also applied to standardized entities and the three dimensional functional space reservation systems including new part numbers for the design entities are generated.

20 Claims, 16 Drawing Sheets

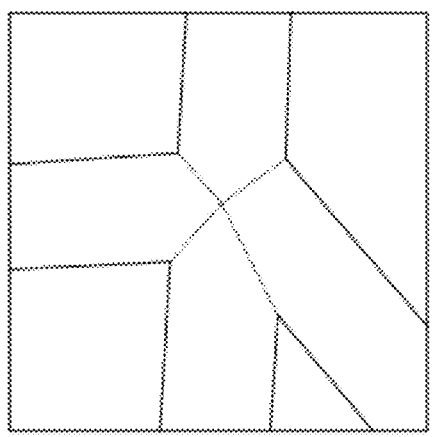
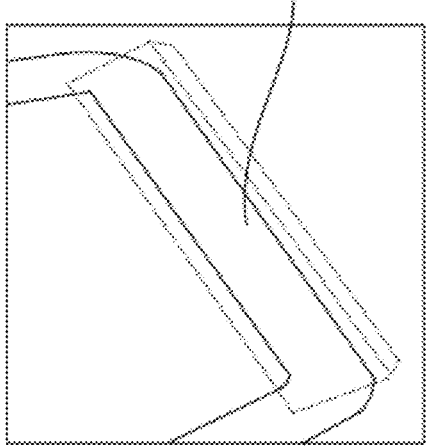
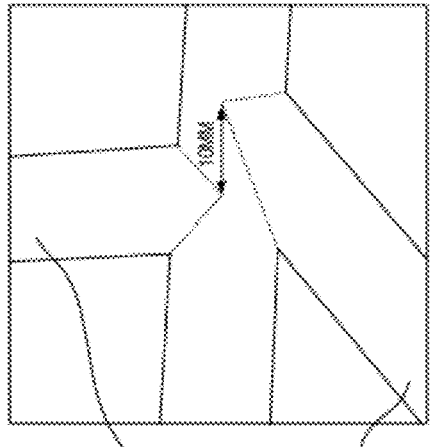
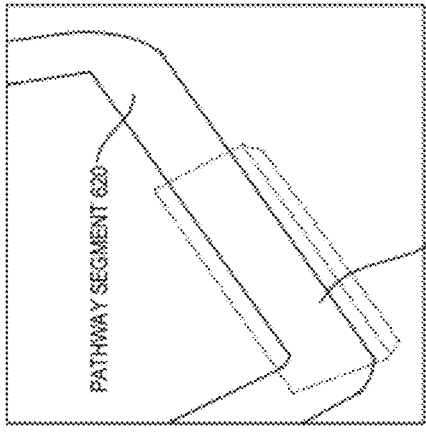
FIG. 6A
FIG. 6B

FIG. 7

SYSTEM AND METHOD FOR GENERATING THREE DIMENSIONAL FUNCTIONAL SPACE RESERVATION SYSTEMS OF A VEHICLE USING DELTA STORAGE

RELATED APPLICATIONS

Benefit is claimed under 35 U.S.C. 119(a)-(d) to Foreign application Serial No. 3343/CHE/2010 filed in INDIA entitled "SYSTEM AND METHOD FOR GENERATING THREE DIMENSIONAL FUNCTIONAL SPACE RESERVATION SYSTEMS OF A VEHICLE USING DELTA STORAGE" by AIRBUS ENGINEERING CENTRE INDIA, filed on 9 Nov. 2010, which is herein incorporated in its entirety by reference for all purposes.

FIELD OF TECHNOLOGY

The present subject matter relates to the field of system architecture design, more particularly, the present subject matter relates to system architecture design of a vehicle, such as an aircraft, a ship, a train, an automobile, and the like.

BACKGROUND

FIG. 1 illustrates a system installation process 100 of an aircraft. In particular, FIG. 1 illustrates an electrical and tubing installation process 100. In FIG. 1, the system installation process 100 may be divided into three phases, such as a conceptual space reservation phase 102, a project lifecycle management (PLM) publication phase 104, and a system installation phase 106. In the conceptual space reservation phase 102, an aircraft structure template having an outer boundary of the aircraft may be extracted from a computer-aided design (CAD) file as in step 108.

In step 110, a conceptual space reservation is generated by referencing the outer boundary of the aircraft. The conceptual space reservation may be a geometric figure of the aircraft where space for design entities of the aircraft as well as functional attributes associated with the design entities may be reserved during the conceptual space reservation phase 102. For example, the conceptual space reservation for equipments, cables and tubes may be performed with geometry size approximation.

Design entities of the aircraft are defined by functional drawings and space is reserved for these design entities during the system layout definition 112. Additionally, functional attributes allocation 114 and functional rules and risk simulation 116 associated with installation of the various systems in the aircraft may be performed during the conceptual space reservation phase 102.

Then, in step 118, the conceptual space reservation of the aircraft is stored in one or more design databases such as a graphics tool database, a legacy CAD tool database, an equipment database and a schematic database. In step 120, three dimensional space reservation systems of the aircraft may be manually generated based on the conceptual space reservation stored in the one or more design databases. Since a designer who had prepared the conceptual space reservation may not be the same designer who has prepared the three dimensional space reservation systems, the functional attributes and/or connectivity information associated with the design entities may not be accurately transformed during conversion from the conceptual space reservation to the three dimensional functional space reservation systems. Thus, the designer who has created the three dimensional space reservation systems of the aircraft may need to recreate or rebuild the functional attributes and/or connectivity information during the detailed design of the aircraft.

Then, in step 124, the three dimensional functional space reservation systems may be stored in a PLM database during the PLM publication phase 104. Further, in step 126, an installation of various systems of the aircraft is performed, where a tubing routing 128, an electrical routing 130, a heating, ventilating, and air conditioning (HVAC) routing 132, a waste routing 134, etc. associated with the aircraft are implemented.

In step 136, visual verification of each aircraft system being installed is repeatedly performed with respect to the three dimensional functional space reservation systems obtained from the PLM database. The visual verification of the compliance may be necessary at this juncture due to the loss of functional attributes and/or connectivity information during generation of the three dimensional functional space reservation systems of the aircraft, although the functional and/or connectivity information may have been available while the conceptual space reservation of the aircraft was being generated.

In addition, the system installation process 100 requires storing each version of the system layout and has no provision for comparison of system layouts so that only those design entities that are modified or newly created can be stored to avoid redundant storage of all the design entities. Typically, there may be nearly thirty thousand design entities (parts) in an aircraft system and during revisions only a few of these design entities (for example, only about 500-600 design entities) are affected and only those affected requires storing. The existing system installation process 100 requires storing all the thirty thousand design entities, which can be very time consuming.

Further, the system installation process 100 requires storing all the design entities with new names. Furthermore, memory storage for each entity in the design layout is created even though a design entity is not affected in the new version. Creating such huge design entities for each small evolution can make the database huge and can result in loss of time in maintainability. Moreover, today, to ascertain any modifications made to design entities with respect to the previous version require manually checking the design entities, which can be very tedious and time consuming process to designers.

BRIEF DESCRIPTION OF THE DRAWINGS

Various preferred embodiments are described herein with reference to the drawings, wherein:

FIGS. 6A and 6B illustrate exemplary processes for applying a set of rules and checks governing a design of the aircraft using a standardization module of FIG. 3, according to one embodiment;

FIG. 7 illustrates a user interface view for configuring a set of functional attributes for applying to a mathematical model generated by a mathematical modeler module of FIG. 3, according to one embodiment;

The drawings described herein are for illustration purposes only and are not intended to limit the scope of the present disclosure in any way.

DETAILED DESCRIPTION

A system and method for generating three dimensional functional space reservation systems of a vehicle using delta storage is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined only by the appended claims.

Figure 1:
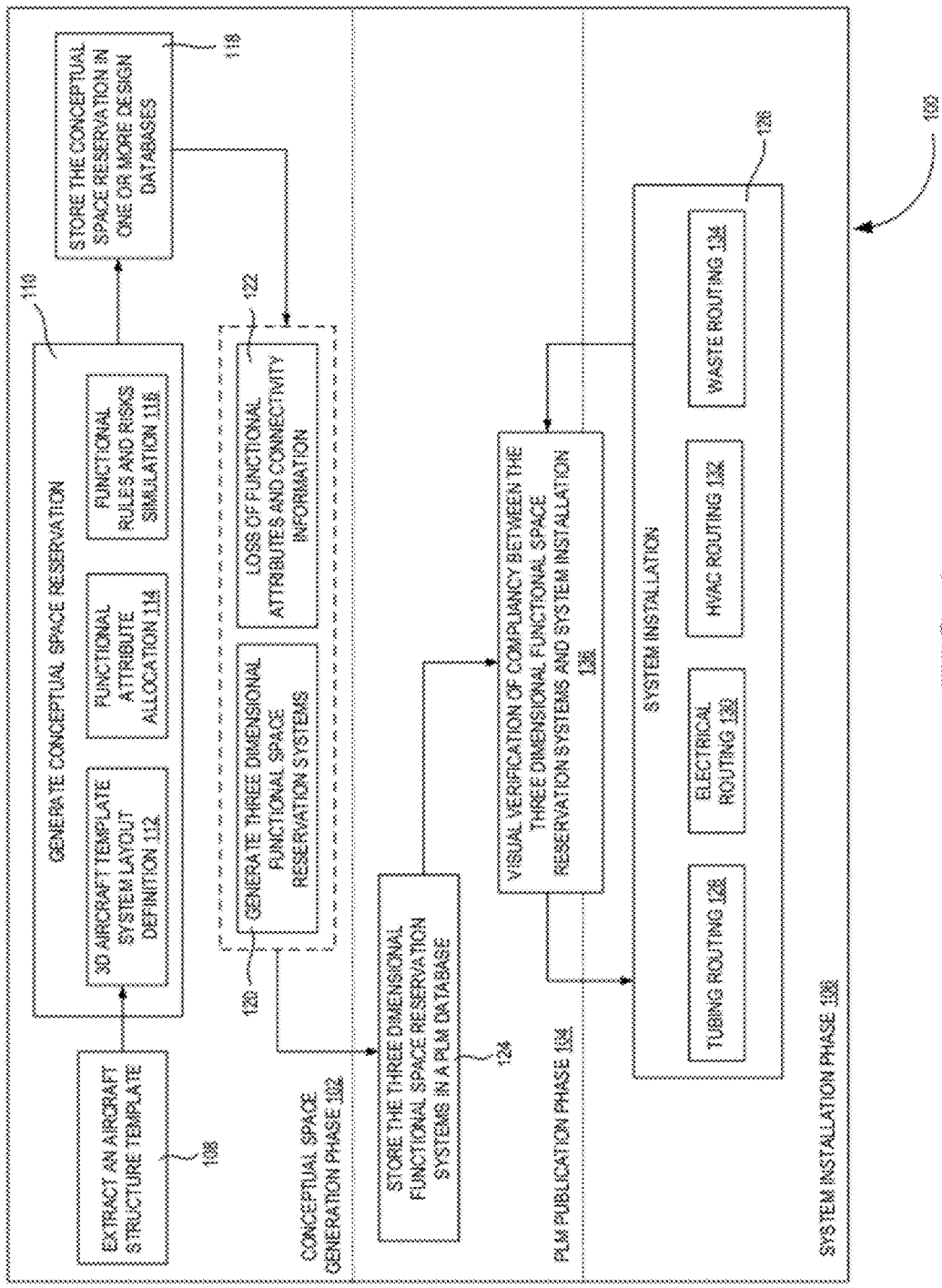
FIG. 1 illustrates a system installation process of an aircraft.
Figure 2:
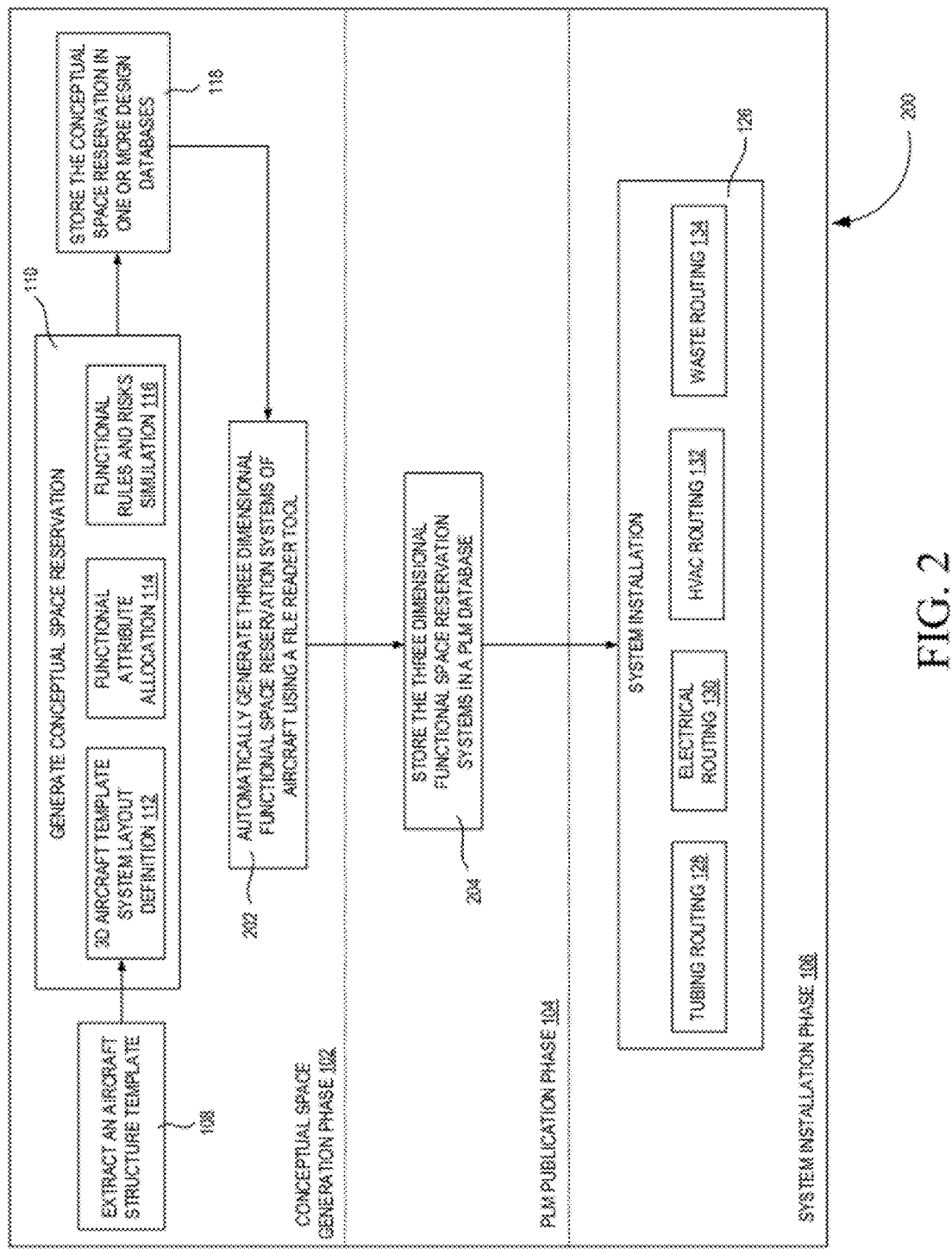
FIG. 2 illustrates a system installation process of an aircraft, according to one embodiment.

FIG. 2 illustrates a system installation process 200 of an aircraft, according to one embodiment. In particular, FIG. 2 illustrates an electrical and tubing installation process 200. It can be seen from FIG. 2 that, the process 200 is similar to the process 100 of FIG. 1, except in the process 200, three dimensional functional space reservation systems of the aircraft (e.g., a hydraulic system, an electrical system, etc.) are generated automatically using a file reader tool based on functional, connectivity and geometrical information, as in step 202. The functional, connectivity and geometrical information may be collected from various design databases associated with a conceptual space reservation of the aircraft. The three dimensional functional space reservation systems are generated for a CAD standard platform and are stored in a file format in the PLM database as in step 204. For example, the three dimensional functional space reservation systems may contain positioning and orientation of equipments, electrical wires, pipes, hydraulic tube lines and so on and connection between other interconnected design entities.

According to the embodiment of the present subject matter, the process 200 retains functional attributes and connectivity information in the three dimensional functional space reservation systems. In other words, the process 200 eliminates the need to recreate or rebuild the functional attributes and/or connectivity information during the detailed design of the aircraft. It can be also noted that, the process 200 eliminates the need for visual verification of compliancy between the three dimensional functional space reservation systems and the system installation. Moreover, the process of generating of the three dimensional functional space reservation systems using the functional, connectivity and geometrical information associated with the conceptual space reservation is explained in greater detail in FIGS. 3 and 5.

Figure 3:
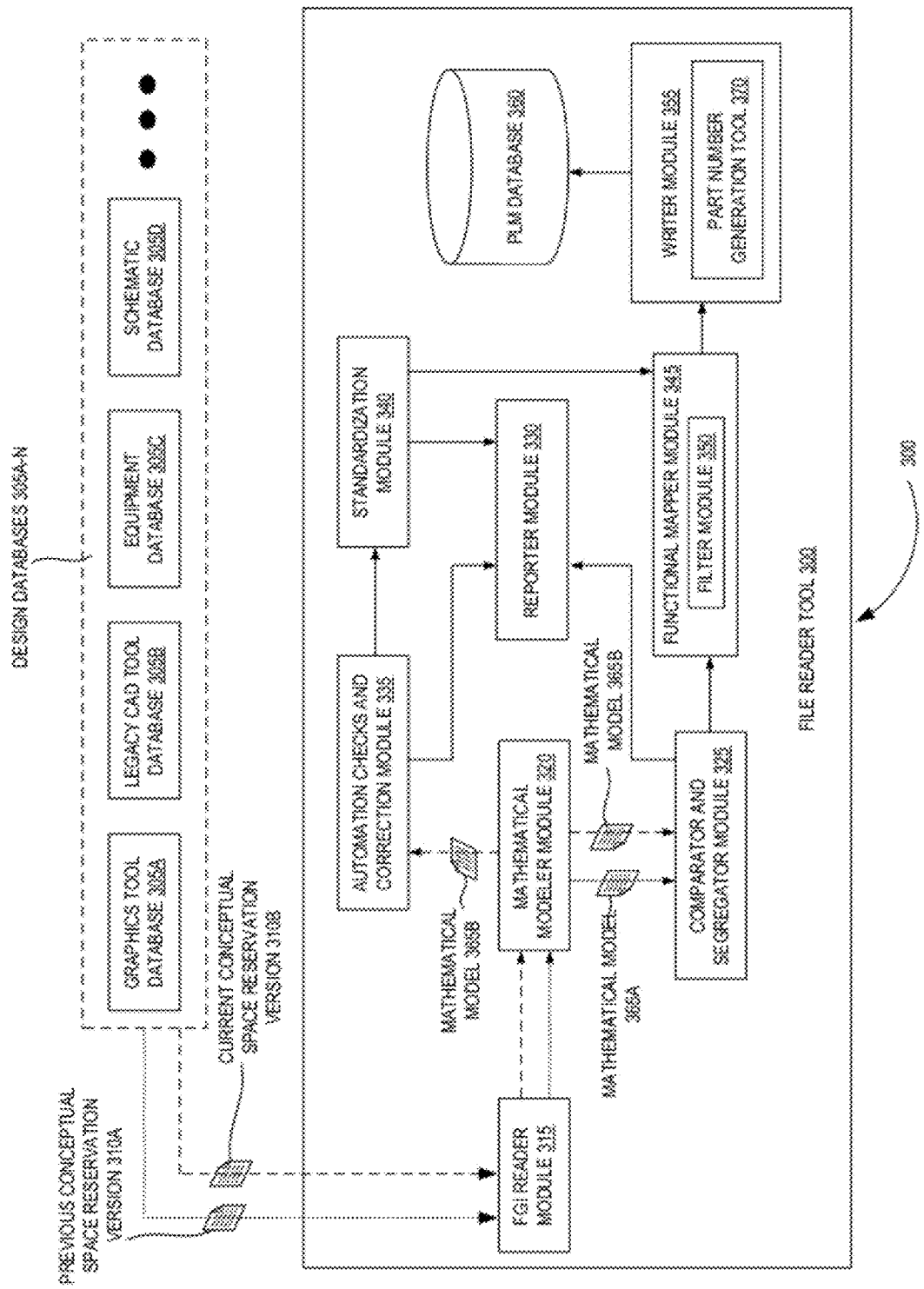
FIG. 3 illustrates a block diagram of a file reader tool for generating three dimensional functional space reservation systems of the aircraft using delta storage, according to one embodiment.
Figure 4A:
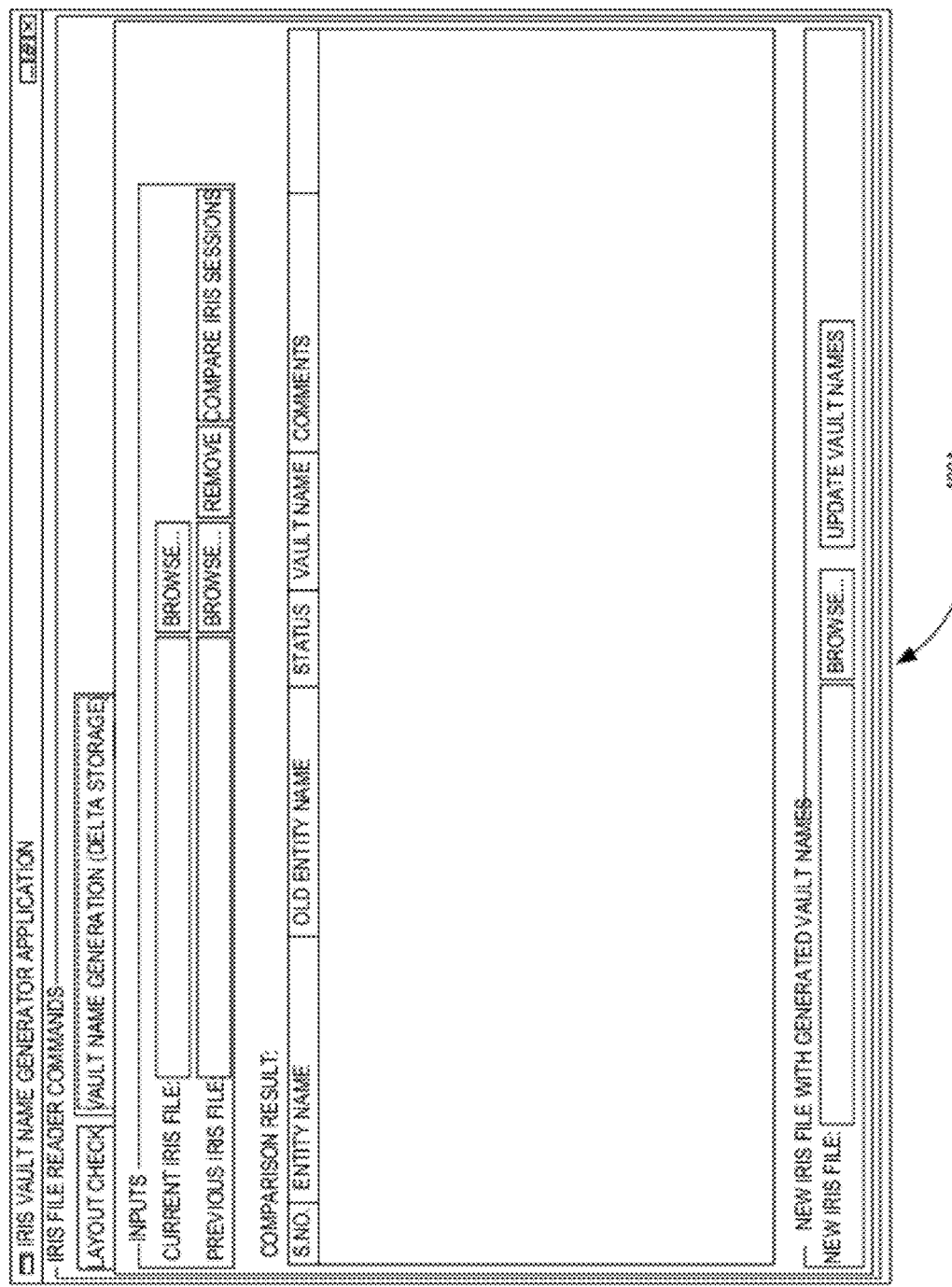
FIGS. 4A through 4F illustrate screenshots explaining generation of new part numbers to the design entities, according to one embodiment.
Figure 4B:
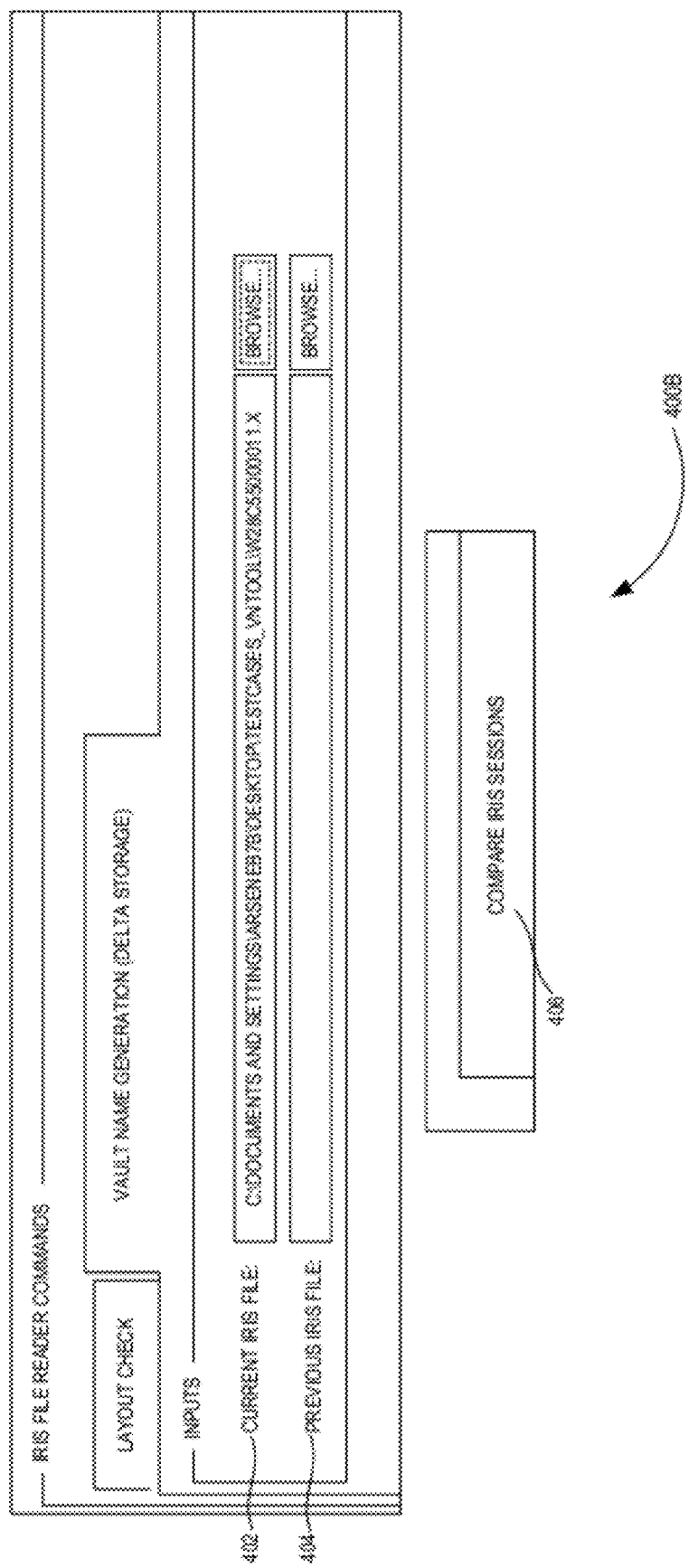
Figure 4C:
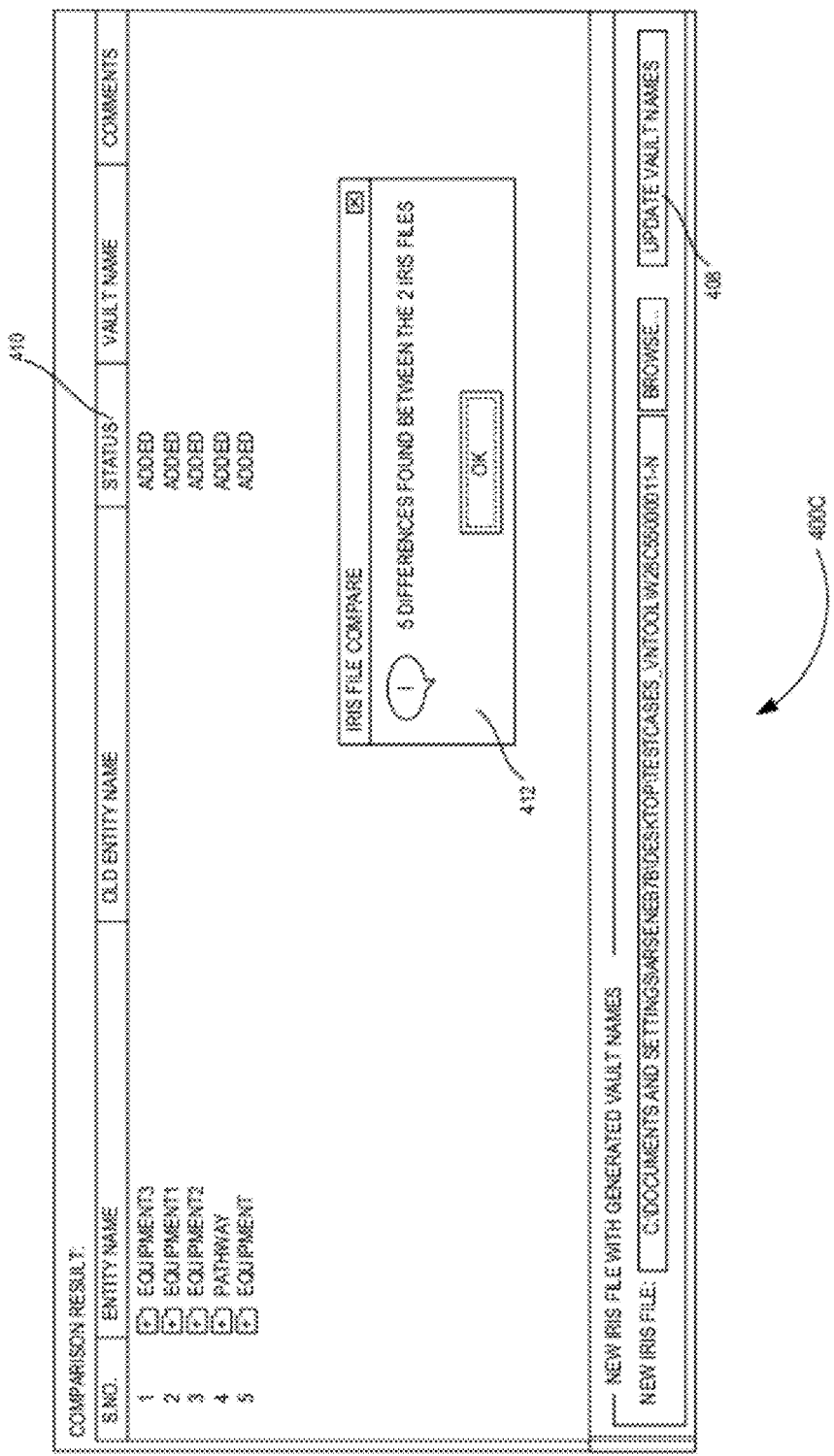
Figure 4D:
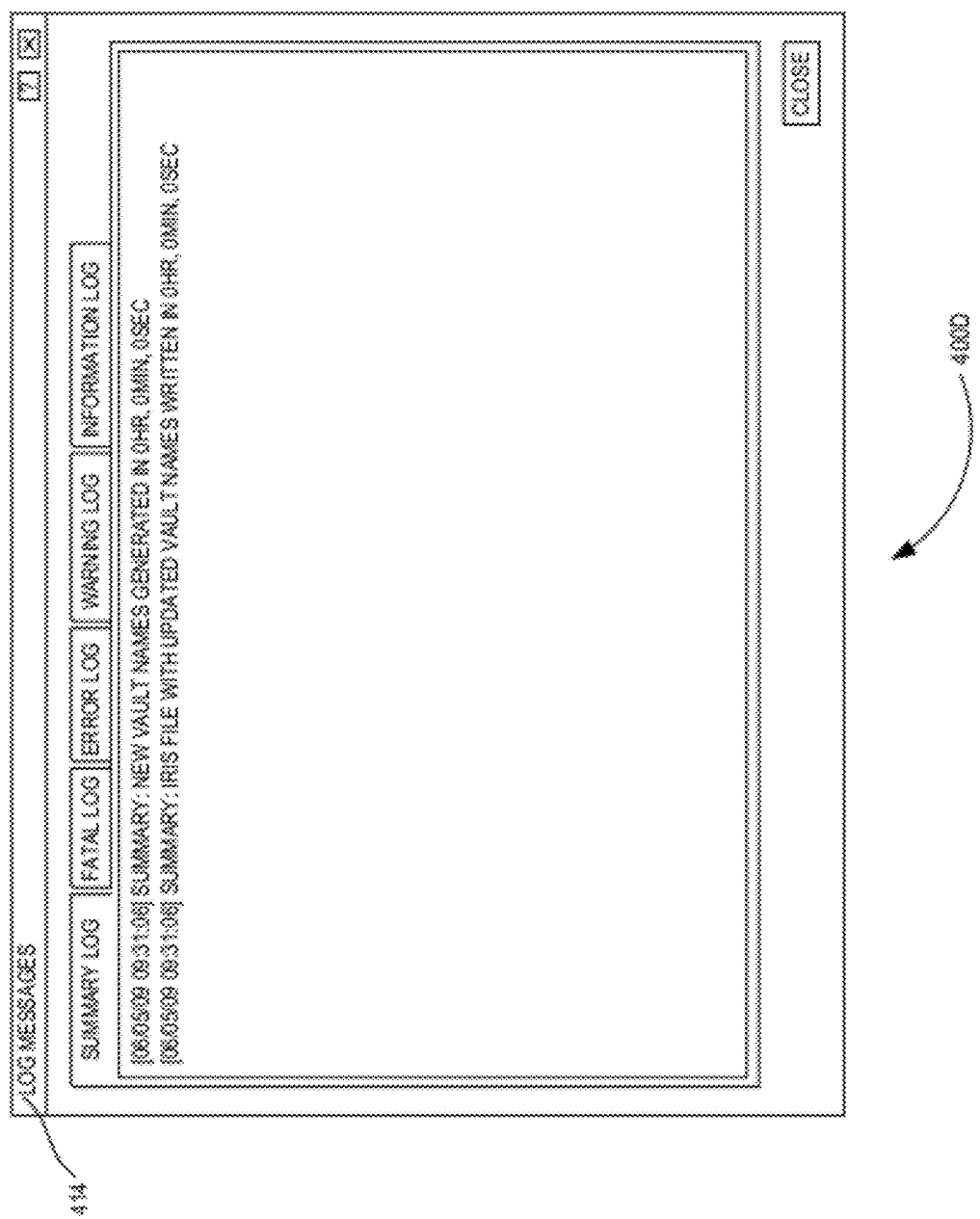
Figures 4E, 4F:
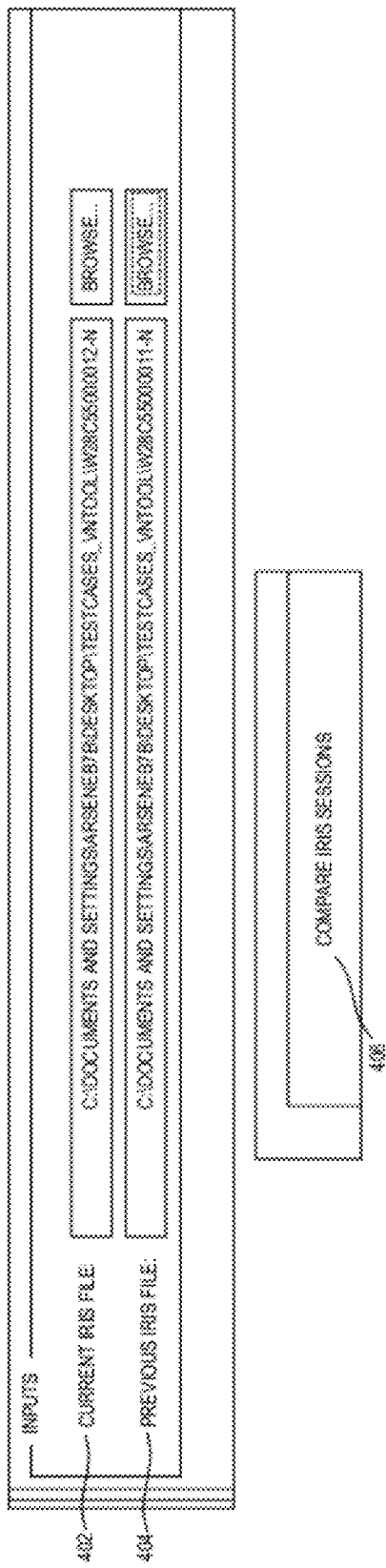

FIG. 3 illustrates a block diagram of a file reader tool 300 for generating the three dimensional functional space reservation systems of the aircraft, according to one embodiment. As illustrated, the file reader tool 300 includes a functional geometrical information (FGI) reader module 315, a mathematical modeler module 320, a comparator and segregator module 325, a reporter module 330, an automation checks and correction module 335, a standardization module 340, a functional mapper module 345, a filter module 350, a writer module 355, a PLM database 360, and a part number generation tool 370.

In an example operation, the FGI reader module 315 collects functional, connectivity, and geometrical information associated with a conceptual space reservation of the aircraft from one or more design databases 305A-N. For example, for a hydraulic system, the functional information may include information associated with a pump of a hydraulic system. The connectivity information may include information of tubes, pipes and harnesses, power source, etc. connected to the pump. The geometrical information may include information related to space occupied by the pump, tubes, pipes, harnesses, power source, etc. and their respective orientation in the hydraulic system. It can be noted that, the installation and maintainability requirements for pumps are also considered during generation of the three dimensional space reservation systems.

The one or more design databases 305A-N include a graphics tool database 305A, a legacy CAD tool database 305B, an equipment database 305C, a schematic database 305D and so on. The graphics tool database 305A may include information associated with the conceptual space reservation created using graphics tools such as Microsoft Visio®, Microsoft PowerPoint® and the like.

The legacy CAD tool database 305B may include information associated with the conceptual space reservation of the aircraft prepared using legacy tools. The equipment database 305C may include information associated with various equipments (e.g., pumps, power source, tubes, blowers, fans, etc.) used in the aircraft. The schematic database 305D may include schematic information (e.g., schematic diagram of electrical wiring of an electrical system) associated with various systems of the aircraft. It can be noted that, the one or more design databases 305A-N may store information associated with different design areas associated with the conceptual space reservation.

It is appreciated that, the functional, connectivity and geometrical information is stored in associated one of the graphics tool database 305A, the legacy CAD tool database 305B, the equipment database 305C, and the schematic database 305D after a preliminary design for the conceptual space reservation has passed through maturity gates associated with the conceptual space reservation. In other words, the functional, connectivity and geometrical information in the one or more design databases 305A-N is matured and is ready for use by the file reader tool 300.

In one example embodiment, the FGI reader module 315 collects the functional, connectivity and geometrical information associated with two conceptual space reservation versions of the aircraft upon receiving a request from a client device (e.g., one of client devices shown in FIG. 5) for generating the three dimensional functional space reservation systems (e.g., a mechanical system, an electrical system, and the like) of the aircraft. The two conceptual space reservation versions of the aircraft include a previous conceptual space reservation version 310A and a current conceptual space reservation version 310B.

The mathematical modeler module 320 is configured to receive a binary form of the functional, connectivity and geometrical information from the FGI reader module 315 and creates mathematical models (e.g., the mathematical model 365A and the mathematical model 365B) in an organized binary form for creating design entities. A mathematical model is a model having information related to relationships between functional information and geometrical information. In one example embodiment, the mathematical modeler module 320 stores the mathematical models 365A and 365B in the binary form in memory of an application server. The comparator and segregator module 325 receives the mathematical models 365A and 365B and outputs delta information detected from the two conceptual space reservation versions of the aircraft. The delta information includes a change (e.g., addition and/or deletion) in the functional or geometric information of the design entities.

The automation checks and correction module 335 receives the mathematical model 365B associated with the current conceptual space reservation version 310B and checks for vehicle industry standards and valid entity names. Further, the automation checks and correction module 335 corrects the entities in the mathematical model 365B associated with the current conceptual space reservation version 310B and outputs corrected entities information in the current conceptual space reservation version 310B. The standardization module 340 applies a set of rules and checks governing a design of the aircraft to the design entities in the mathematical model 365B of the current conceptual space reservation version 310B and outputs standardized entities information, as will be illustrated in FIGS. 6A and 6B.

The set of rules and checks are applied to check feasibility, thumb rule, and prior aircraft system design knowledge from previous design programs. For example, the set of rules and checks includes a set of design rules and checks with respect to color layering, naming and part numbering of design entities based on a design standard, an information system standard and/or a PLM database standard. The reporter module 330 receives the delta information from the comparator and segregator module 325, corrected entities information from the automation checks and correction module 335 and standardized entities information from the standardization module 340 and reports out in user understandable information via a GUI interface.

Further, the functional mapper module 345 receives the delta information from the comparator and segregator module 325 and applies a set of functional attributes to the standardized entities associated with the delta information to create standardized functional entities associated with the delta information. For example, the set of functional attributes may include setting pressure, flow, and temperature on a hydraulic system in the aircraft or setting voltage, current, and route information on an electrical system in the aircraft. The functional mapper module 345 also includes a filter module 350 to separate design entities based on the delta information and sends the separated design entities information to the writer module 355.

The writer module 355 then generates the three dimensional functional space reservation systems of the aircraft including new part numbers for the design entities associated with the delta information for a CAD standard platform and stores the design entities in the generated three dimensional functional space reservation systems of the aircraft. For example, the part number generation tool 370 generates new part numbers for the design entities based on the created standardized functional entities associated with the delta information. The part number generation for the design entities is explained in greater detail with respect to FIGS. 4A through 4F. Further, as described in FIG. 2, the three dimensional functional space reservation systems are stored in a file format (e.g., a CAD file format) in the PLM database 360.

FIGS. 4A through 4F illustrate screenshots explaining generation of new part numbers to the design entities, according to one embodiment. For example, screenshot 400A shows launching of the part number generation tool 370 by clicking on a delta laycheck button. As shown in the screenshot 400B, the current conceptual space reservation version 310B is uploaded in a current interactive routing for installation of systems (IRIS) file tab 402 while a previous IRIS file tab 404 is empty. This creates new part numbers for all design entities. Sessions are compared by clicking on a compare IRIS sessions button 406. The screenshot 400C shows the comparison with statuses such as added, modified, deleted, no change and the like in the status column 410. A pop up 412 also displays the number of differences found. Further, new file name may be also given to the current conceptual space reservation version 310B including the new part numbers. By clicking on update part number button 408, the current conceptual space reservation version 310B gets updated with the new part numbers.

The screenshot 400D shows a log message folder 414 where summary log, fatal log, error log, warning log and information log may be displayed. Further, if part numbers are to be differentially updated, the current conceptual space reservation version 310B is uploaded in the current IRIS file tab 402 and the previous conceptual space reservation version 310A is uploaded in the previous IRIS file tab 404, as shown in the screenshot 400E. By clicking on the compare IRIS sessions button 406, the screenshot 400F is displayed which shows the number of differences found and also the detailed comparison. For example, the screenshot 400F displays design entity name, old entity name, status, part number, and comments. Using the update part number button 408, the current conceptual space reservation version 310B gets updated with the new part numbers.

Figure 5:
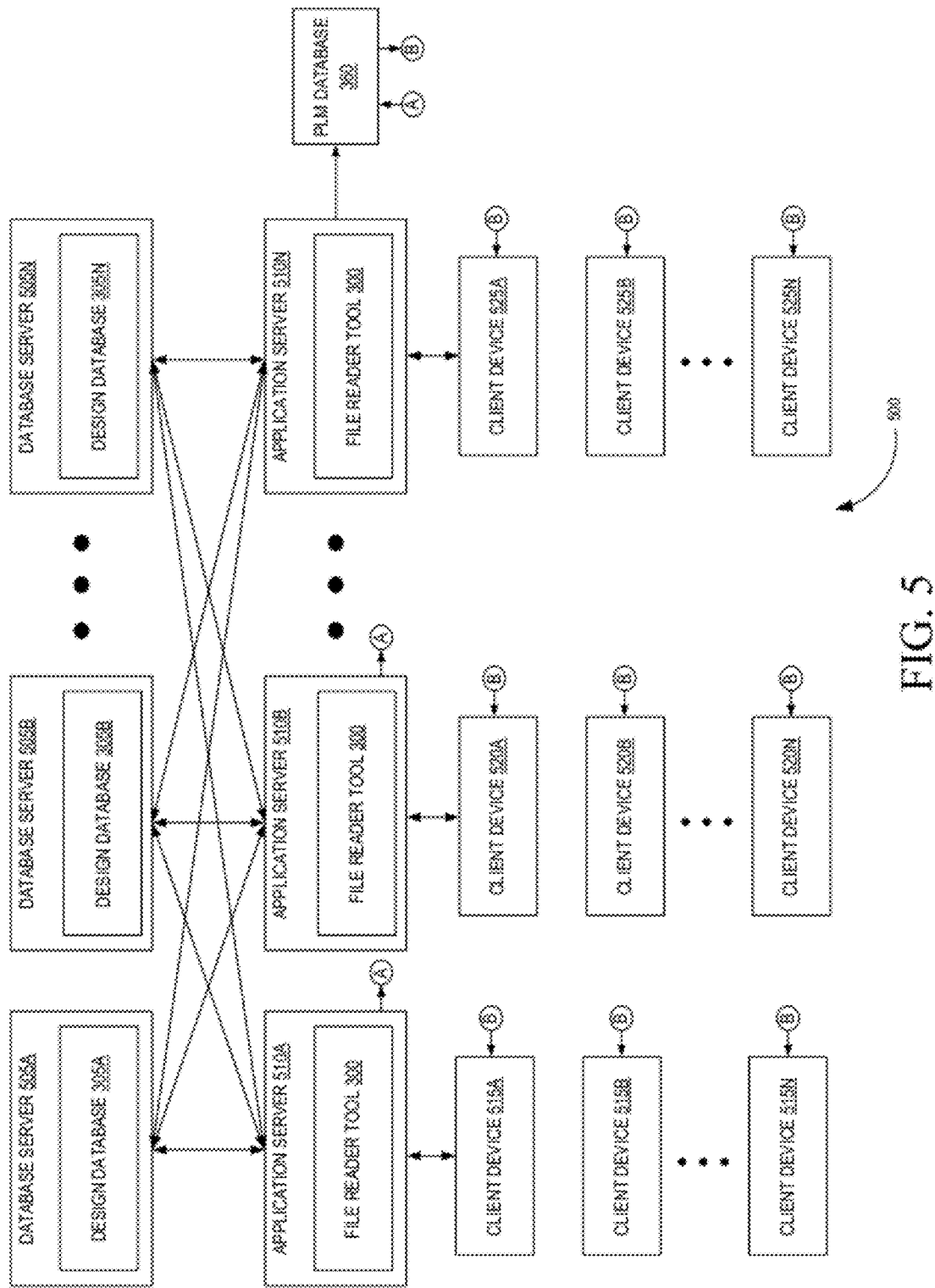
FIG. 5 illustrates a block diagram of an exemplary network system for generating the three dimensional functional space reservation system of the aircraft using the delta storage, according to one embodiment.

FIG. 5 illustrates a block diagram of an exemplary network system 500 for generating the three dimensional functional space reservation system of the aircraft using the delta storage, according to one embodiment. The network system 500 includes database servers 505A-N, application servers 510A-N and the PLM database 360. As illustrated, the design databases 305A-N reside in the database servers 505A-N, respectively. Further, the file reader tool 300 resides in each of the application servers 510A-N. The network system 500 includes client devices 515A-N, client devices 520A-N and client devices 525A-N. For example, each client device may be a workstation, a desktop, and a laptop.

In FIG. 5, each of the application servers 510A-N is coupled to the database servers 505A-N. Also, said each of the application servers 510A-N is coupled to the PLM database 360. Further, the client devices 515A-N, the client devices 520A-N and the client devices 525A-N are coupled to the application server 510A, the application server 510B, and the application server 510N, respectively. Also, the client devices 515A-N, the client devices 520A-N and the client devices 525A-N are coupled to the PLM database 360.

In one exemplary implementation, the network system 500 is operable for generating the three dimensional functional space reservation system of the aircraft. For example, consider that, a client device 515A generates a request for the three dimensional functional space reservation system of the aircraft and forwards the request to the application server 510A. In such scenario, the file reader tool 300 in the application server 510A collects functional, connectivity and geometrical information associated with the conceptual space reservation of the aircraft from the design databases 305A-N.

Then, the file reader tool 300 generates the three dimensional functional space reservation system of the aircraft for a CAD standard platform based on the functional, connectivity and geometrical information (e.g., using the modules of the file reader tool 300 described in FIG. 3). On one hand, the application server 510A returns the three dimensional functional space reservation system to the client device 510A in response to the request. On the other hand, the application server 510A stores the three dimensional functional space reservation to the PLM database 360 such that the client devices 515A-N, 520A-N, and 525A-N can use the three dimensional functional space reservation system from the PLM database 360.

FIGS. 6A and 6B illustrate exemplary processes 600A and 600B for applying a set of rules and checks governing a design of an aircraft using the standardization module 340 of FIG. 3, according to one embodiment. The set of rules and checks includes a set of design rules and checks with respect to color layering, naming and part numbering of design entities based on a design standard, an information system standard and/or a PLM database standard. It is appreciated that, the set of rules and checks may be configured by an administrator of the network system 500 or the designer using the file reader tool 300 for generating the three dimensional functional space reservation system of the aircraft.

In one embodiment, the set of rules and checks are configured to check feasibility, thumb rule and prior aircraft system design knowledge from previous design programs. For example, the check for feasibility may include checking minimum bend radius at corners of the design entities, minimum thickness of the design entities, minimum distance between two design entities, and so on. As shown in FIG. 6A, pathways 605 and 610 are merged together at one point as distance between the pathways 605 and 610 is less than or equal to 10 mm. Similarly, as illustrated in FIG. 6B, pathway segments 615 and 620 are merged together to form a pathway segment 625 as the pathway segments 615 and 620 are in straight line and have identical names.

Figure 7:
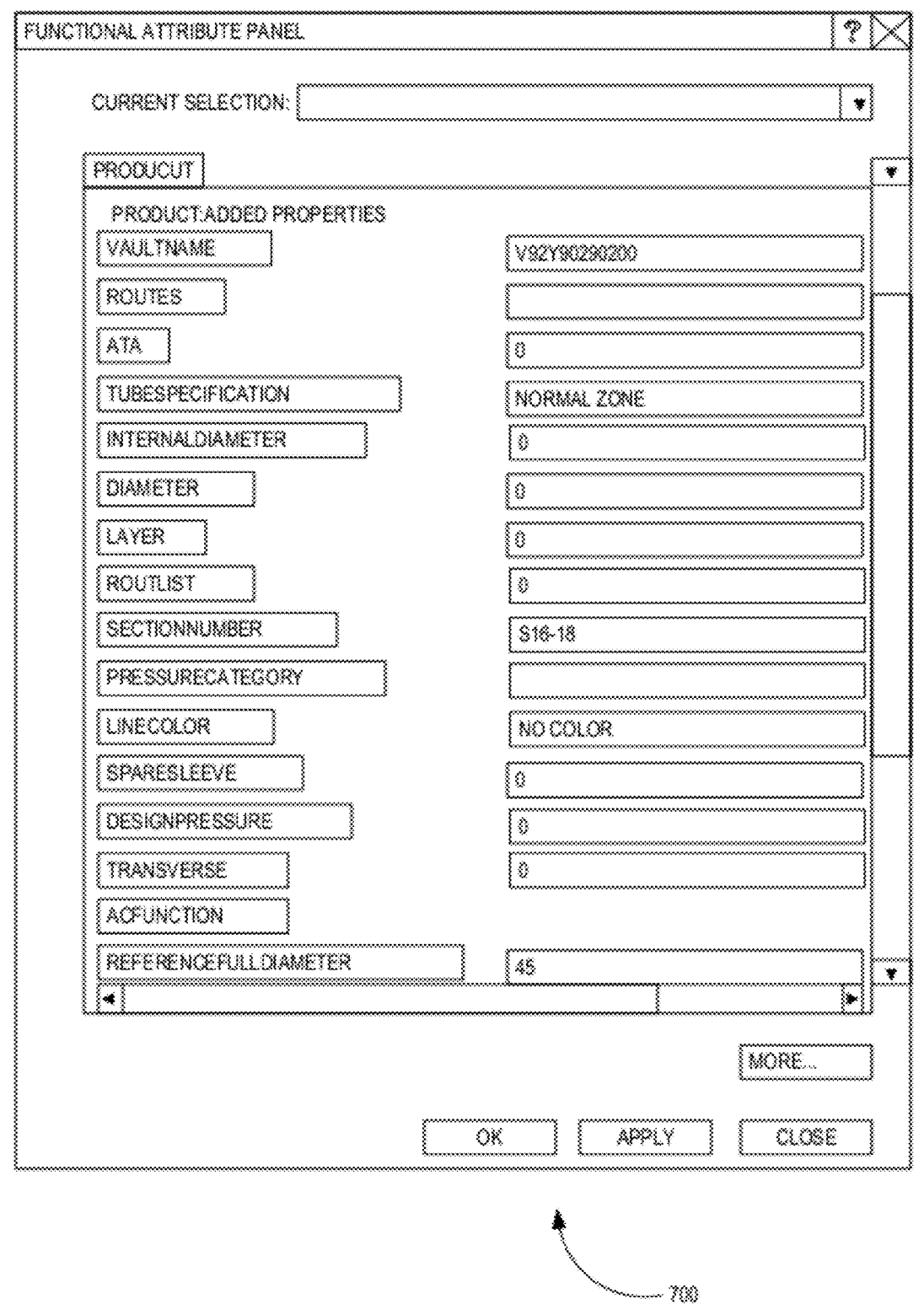

FIG. 7 illustrates a user interface view 700 for configuring a set of functional attributes for applying to the mathematical model (e.g., equipment, pathways, etc.) generated by the mathematical modeler module 320 of FIG. 3, according to one embodiment. In one exemplary implementation, the user interface view 700 allows a user (e.g., a design engineer) to set pressure, flow and temperature on a hydraulic system of the aircraft. In another exemplary implementation, the user interface view 700 allows the user to set voltage, current and route information on an electrical system of the aircraft.

Figure 8A:
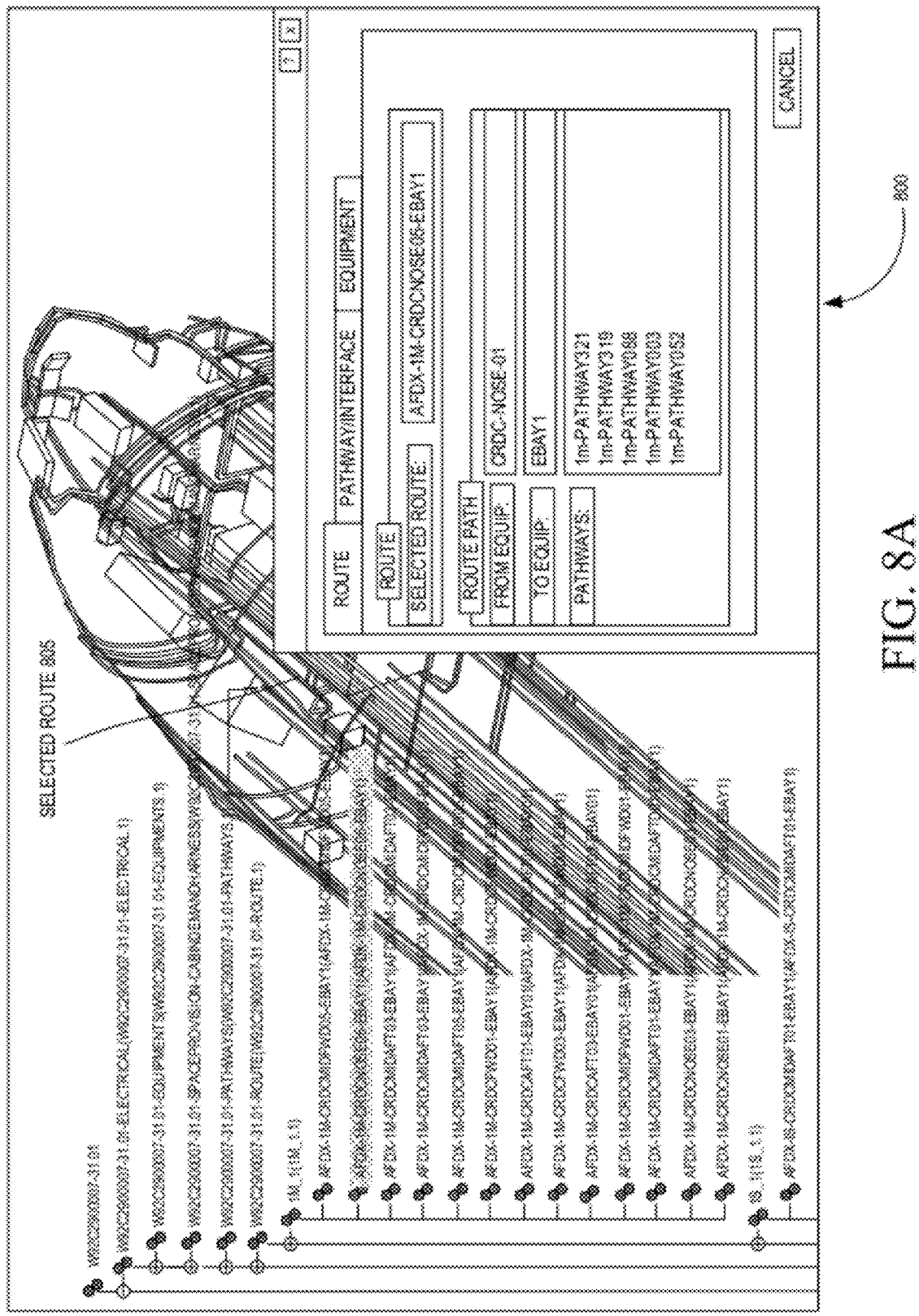
FIGS. 8A through 8C illustrate screenshot views showing a network of connected components associated with the three dimensional functional space reservation system, generated using the file reader tool of FIG. 3, of a particular functionality, according to one embodiment.
Figure 8B:
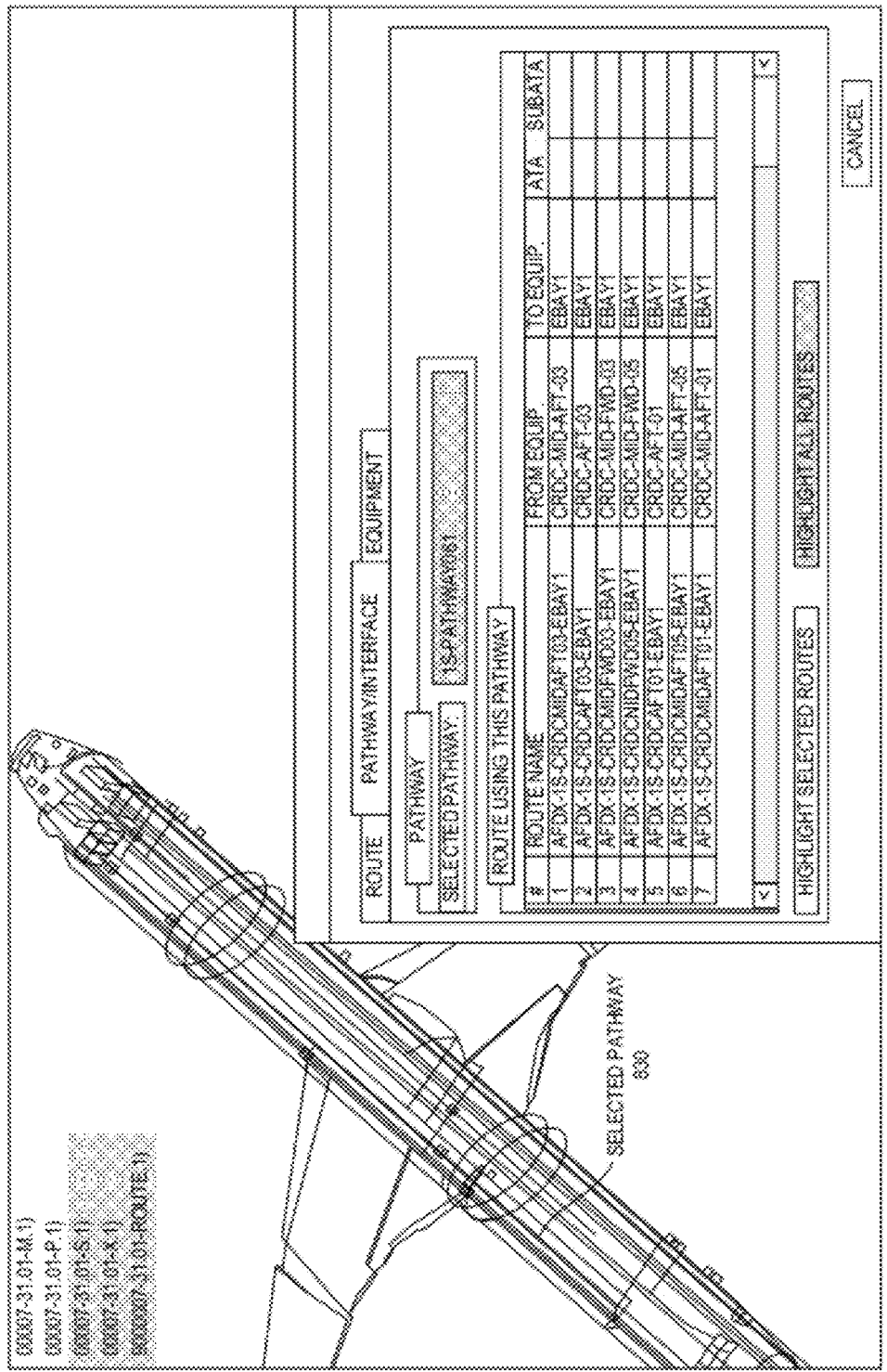
Figure 8C:
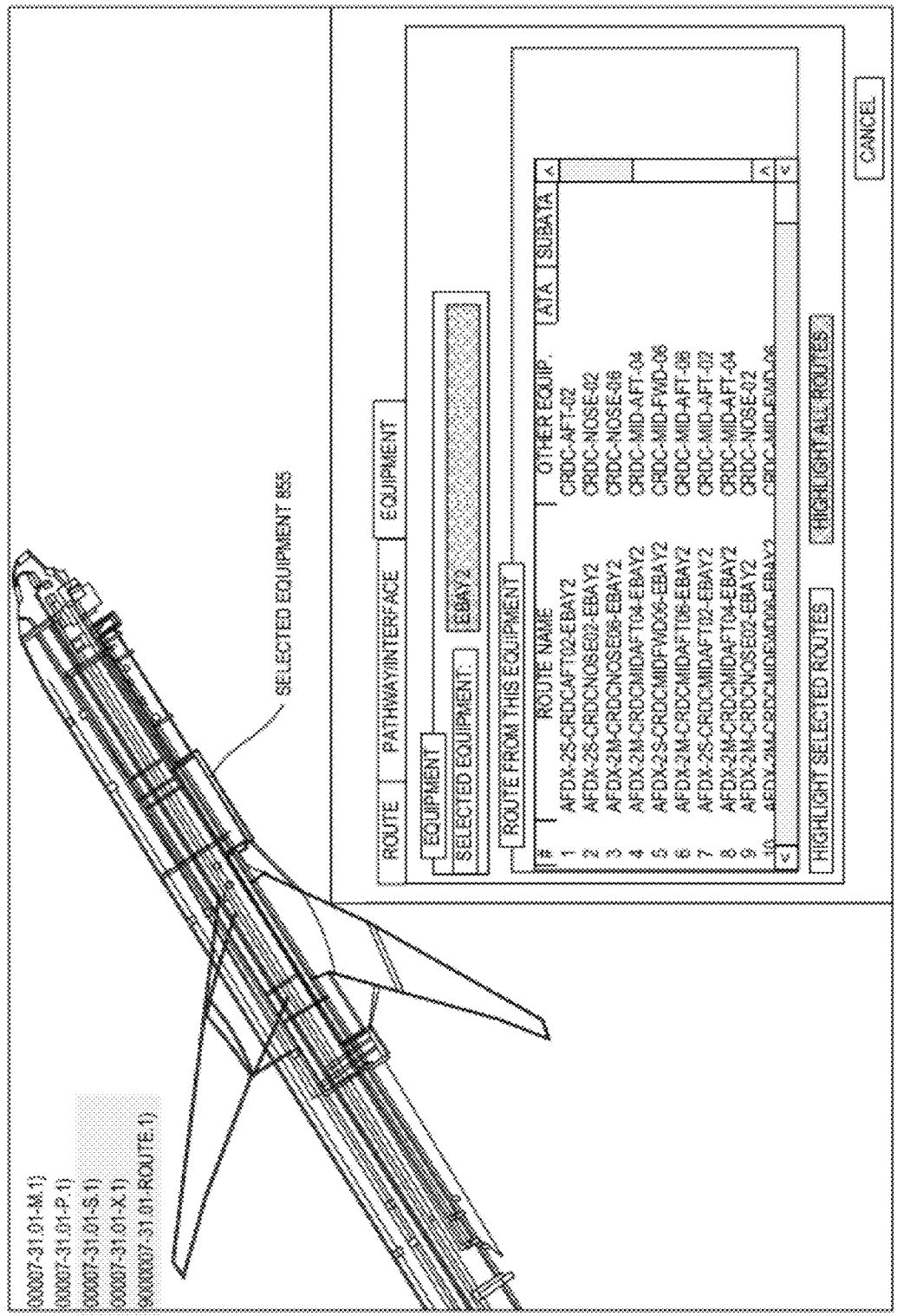

FIGS. 8A through 8C illustrate screenshot views 800, 825 and 850 showing networks of connected components associated with the three dimensional functional space reservation systems, generated using the file reader tool 300 of FIG. 3, of a particular functionality, according to one embodiment. In one example embodiment, the network of the connected components of the particular functionality provides a logical connection between various design entities of the three dimensional functional space reservation systems.

In FIG. 8A, the screenshot view 800 displays a network of connected components for a route 805 selected by a user (e.g., design engineer). For example, the network for the selected route 805 is displayed by highlighting connected equipments and pathways associated with the selected route 805. In FIG. 8B, the screenshot view 825 displays a network of connected components for a pathway 830 selected by the user. For example, the network for the selected pathway 830 is displayed by highlighting routes passing through the selected pathway 830 and equipments connected to the routes. In FIG. 8C, the screenshot view 850 displays a network of connected components for an equipment 855 selected by the user. For example, the network for the selected equipment 855 is displayed by highlighting all routes connected to the selected equipment 855.

Figure 9:
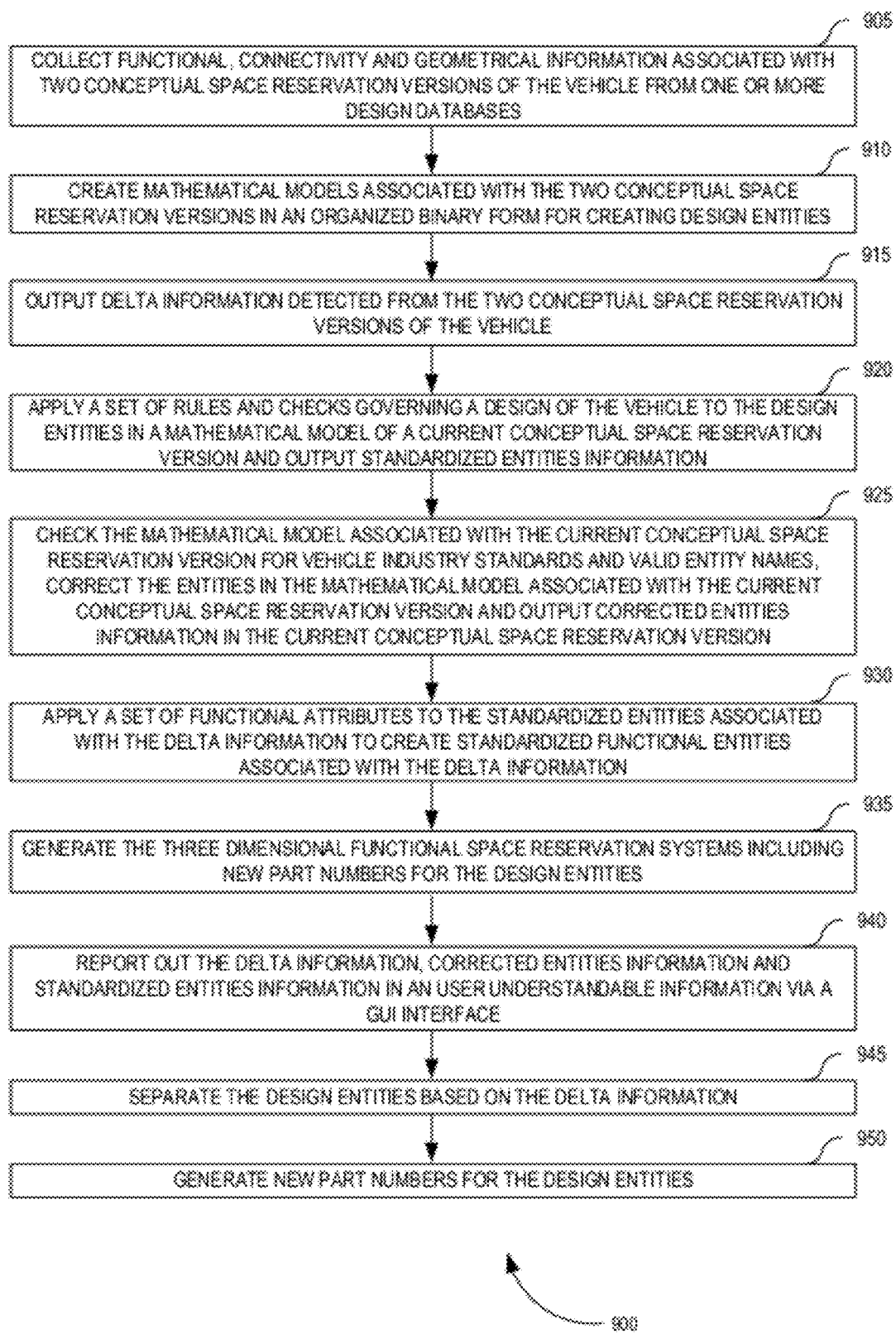
FIG. 9 illustrates a process flowchart of an exemplary method for generating the three dimensional functional space reservation systems of the aircraft using the delta storage, according to one embodiment.

FIG. 9 illustrates a process flowchart of an exemplary method 900 for generating three dimensional functional space reservation systems of an aircraft using delta storage, according to one embodiment. At step 905, functional, connectivity and geometrical information associated with two conceptual space reservation versions of the aircraft is collected from one or more design databases (e.g., a graphics tool database 305A, a legacy CAD tool database 305B, an equipment database 305C, a schematic database 305D, and the like).

In one embodiment, the functional, connectivity and geometrical information are collected upon receiving a request from a client device for three dimensional functional space reservation systems of the aircraft. The two conceptual space reservation versions include a current conceptual space reservation version and a previous conceptual space reservation version. Further, the functional, connectivity and geometrical information associated with the two conceptual space reservation versions are transformed into a binary form, where each conceptual space reservation version includes multiple design entities.

At step 910, mathematical models are created in an organized binary form for creating design entities associated with the two conceptual space reservation versions. The mathematical models are stored in memory of an application server (e.g., one of the application servers 510A-N of FIG. 5). At step 915, delta information detected from the two conceptual space reservation versions of the aircraft is outputted. At step 920, a set of rules and checks governing a design of the aircraft is applied to the design entities in the mathematical model of the current conceptual space reservation version and standardized entities information is outputted. The set of design rules are applied with respect to color layering, naming and part numbering of design entities based on a design standard, an information system standard and/or a PLM database standard.

At step 925, the mathematical model associated with the current conceptual space reservation version is checked for aircraft industry standards and valid entity names and corrected. Further, the corrected entities information in the current conceptual space reservation version is outputted. At step 930, a set of functional attributes is applied to the standardized entities associated with the delta information to create standardized functional entities associated with the delta information. In one embodiment, the set of functional attributes is applied by setting pressure, flow, and temperature on a hydraulic system of the aircraft. Also, the set of functional attributes are applied by setting voltage, current, and routing information on an electrical system of the aircraft.

At step 935, the three dimensional functional space reservation systems including new part numbers for the design entities are generated. The design entities are stored in the generated three dimensional functional space reservation system of the vehicle for a CAD standard platform based on the created standardized functional entities associated with the delta information. In one example embodiment, the three dimensional functional space reservation systems are generated by generating each object in the three dimensional functional space reservation systems as a three dimensional design entity with at least one functional link to the three dimensional entity of the three dimensional functional space reservation systems.

At step 940, the delta information, corrected entities information and standardized entities information are reported out in user understandable information via a GUI interface. At step 945, the design entities are separated based on the delta information. At step 950, new part numbers are generated for the separated design entities based on the created standardized functional entities associated with the delta information.

Figure 10:
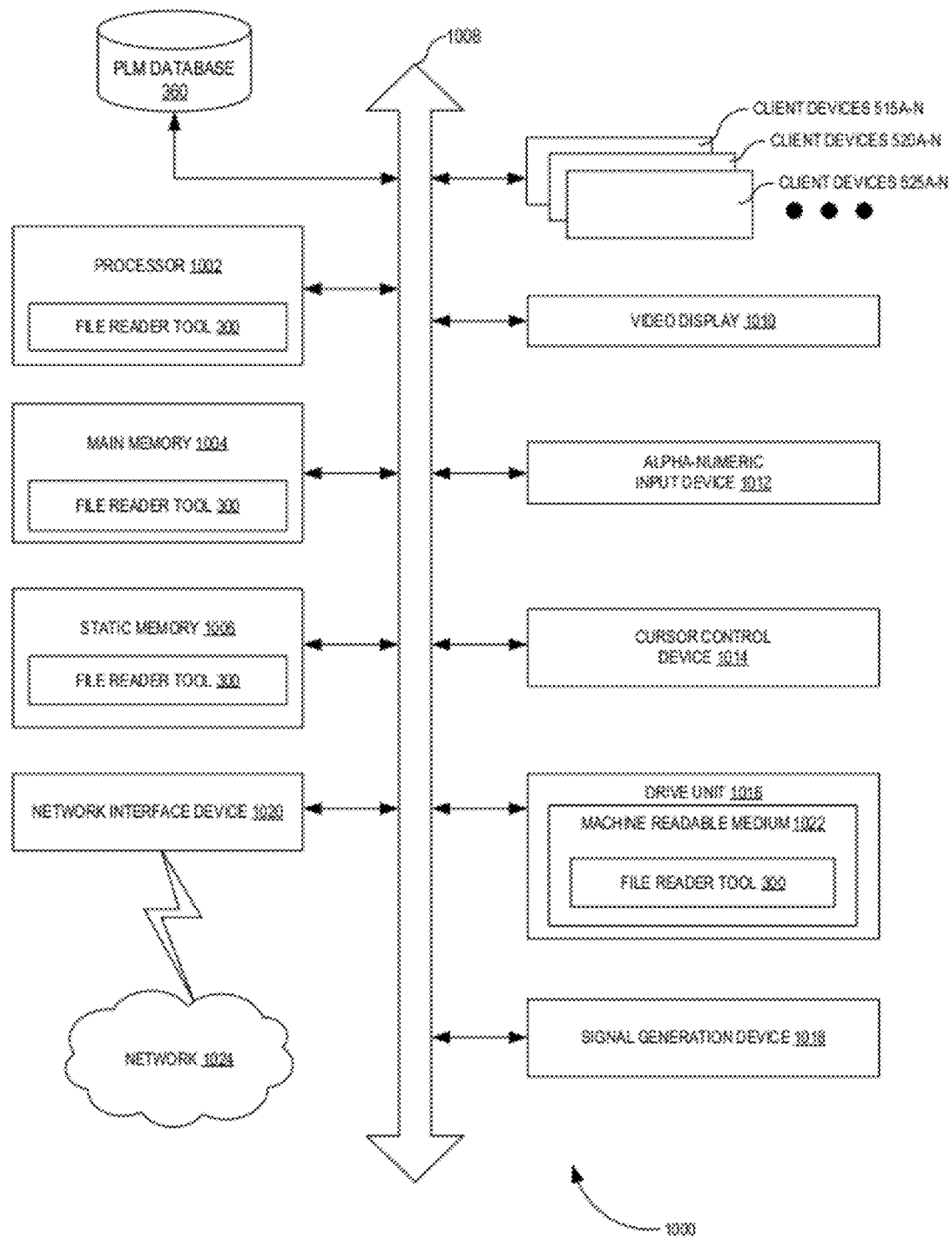
FIG. 10 illustrates a diagrammatic system view of an example data processing system of an aircraft system architecture design in which any of the embodiments disclosed herein may be performed, according to one embodiment.

FIG. 10 illustrates a diagrammatic system view of an example data processing system 1000 of an aircraft design system in which any of the embodiments disclosed herein may be performed, according to one embodiment. Particularly, the diagrammatic system view of FIG. 10 illustrates a processor 1002, a main memory 1004, a static memory 1006, a bus 1008, a video display 1010, an alpha-numeric input device 1012, a cursor control device 1014, a drive unit 1016, a signal generation device 1018, a network interface device 1020, a machine readable medium 1022, a network 1024, a file reader tool 300, the PLM database 360, and client devices 515A-N, client device 520A-N and client devices 525A-N.

The diagrammatic system view may indicate the data processing system 1000 in which one or more operations disclosed herein are performed. The processor 1002 may be a microprocessor, a state machine, an application specific integrated circuit, a field programmable gate array, etc. The main memory 1004 may be a dynamic random access memory and/or a primary memory of a computer system. The static memory 1006 may be a hard drive, a flash drive, and/or other memory information associated with the data processing system 1000.

The bus 1008 may be an interconnection between various circuits and/or structures of the data processing system 1000. The video display 1010 may provide graphical representation of information on the data processing system 1000. The alpha-numeric input device 1012 may be a keypad, keyboard, and/or any other input device of text (e.g., a special device to aid the physically handicapped). The cursor control device 1014 may be a pointing device such as a mouse. The drive unit 1016 may be a hard drive, a storage system, and/or other longer term storage subsystem.

The signal generation device 1018 may be a basic input output system (BIOS) and/or a functional operating system of the data processing system 1000. The network interface device 1020 may perform interface functions (e.g., code conversion, protocol conversion, and/or buffering) required for communications to and from the network 1026 between a number of independent devices (e.g., of varying protocols). The machine readable medium 1022 may provide instructions on which any of the methods disclosed herein may be performed. For example, the machine readable medium or computer readable storage medium 1022 may have instructions, that when executed by a computer (e.g., the data processing system 1000), causes the computer to perform a method as illustrated in FIG. 9.

The file reader tool 300 may provide source code and/or data code to the processor 1002 to enable any one or more operations disclosed herein. The PLM database 360 coupled to the data processing system 1000 may be a database coupled to the processor 1002. The PLM database 360 may be configured for storing the three dimensional functional space reservation systems automatically generated based on functional, connectivity and geometrical information associated with a conceptual space reservation of the aircraft using the file reader tool 300. The client devices 515A-N, 520A-N, and 525A-N may be desktops, workstations, or laptops which access the three dimensional functional space reservation systems from the PLM database 360 via the network 1024.

In various embodiments of the systems and methods described in FIGS. 2 through 10, the present subject matter provides a real-world three dimensional geometry of various systems associated with the aircraft to design engineers at the conceptual space reservation phase. This avoids rework and human errors. Thus, the above-described methods and systems enable the design engineers to perform analysis of the real-world three dimensional geometry at the conceptual space reservation phase. The above-described methods and systems significantly reduce the development life cycle of the aircraft and enable greater number of iterations in short duration. Since only the modified and created design entities are given new part numbers, there is no requirement of huge databases.

Although the systems and methods in FIGS. 2 through 10 are described with respect to generation of three dimensional functional space reservation systems of an aircraft from a conceptual space reservation, one can envision that the systems and methods described herein can be used to generate three dimensional functional space reservation systems of other vehicles such as an automobile, a ship, a train, and the like.

A skilled person will recognize that many suitable designs of the systems and processes may be substituted for or used in addition to the configurations described above. It should be understood that the implementation of other variations and modifications of the embodiments of the present subject matter and its various aspects will be apparent to one ordinarily skilled in the art, and that the present subject matter is not limited by the exemplary embodiments described herein and in the claims. Therefore, it is contemplated to cover the present embodiments of the present subject matter and any and all modifications, variations, or equivalents that fall within the true spirit and scope of the basic underlying principles disclosed and claimed herein.

What is claimed is:

1. A system for generating three dimensional functional space reservation systems of a vehicle using delta storage, comprising:
    a processor; and
    memory coupled to the processor, Wherein the memory comprises a file reader tool including:
        a functional geometrical information (FGI) reader module for collecting functional, connectivity and geometrical information associated with two conceptual space reservation versions of the vehicle from one or more design databases upon receiving a request from a client device for three dimensional functional space reservation systems, wherein the two conceptual space reservation versions include a current conceptual space reservation version and a previous conceptual space reservation version, wherein the functional, connectivity and geometrical information associated with the two conceptual space reservation versions are transformed into a binary form, and wherein each conceptual space reservation version includes multiple design entities;
        a mathematical modeler module for receiving the binary form of the functional, connectivity and geometrical information associated with the two conceptual space reservation versions and creating associated mathematical cal models in an organized binary form for creating design entities associated with the two conceptual space reservation versions;

a comparator and segregator module for receiving the mathematical models and outputting delta information detected from the two conceptual space reservation versions of the vehicle;

a standardization module for applying a set of rules and checks governing a design of the vehicle to the design entities in the mathematical model of the current conceptual space reservation version and outputting standardized entities information;

a functional mapper module for receiving the delta information from the comparator and segregator module and applying a set of functional attributes to the standardized entities associated with the delta information to create standardized functional entities associated with the delta information; and a writer module for generating the three dimensional functional space reservation systems including new part numbers for the design entities associated with the delta information for a computer-aided design (CAD) standard platform and storing the design entities in the generated three dimensional functional space reservation systems of the vehicle.

2. The system of claim 1, wherein the file reader tool further comprises:

an automation checks and correction module for receiving the mathematical model associated with the current conceptual space reservation version checking for vehicle industry standards and valid entity names, correcting the entities in the mathematical model associated with the current conceptual space reservation version and outputting corrected entities information in the current conceptual space reservation version.

3. The system of claim 2, wherein the file reader tool further comprises:

a reporter module to receive the delta information from the comparator and segregator module, corrected entities information from the automation checks and correction module, and standardized entities information from the standardization module and to report out in user understandable information via a GUI interface.

4. The system of claim 1, wherein the delta information comprises change in the functional or geometric information of the design entities.

5. The system of claim 1, wherein the functional mapper module comprises a filter module to separate the design entities based on the delta information and to send the separated design entities information to the writer module.

6. The system of claim 5, wherein the writer module comprises a part number generation tool for generating the new part numbers for the separated design entities based on the created standardized functional entities associated with the delta information.

7. The system of claim 1, wherein the three dimensional functional space reservation systems comprises systems selected from the group consisting of a mechanical system and an electrical system.

8. The system of claim 1, wherein the set of rules and checks comprises a set of design rules and checks with respect to color layering, naming and part numbering of design entities based on at least one design standard, information system standard, and PLM database standard.

9. The system of claim 1, wherein the set of rules and checks are configured to check feasibility, thumb rule and prior vehicle system design knowledge from previous design programs.

10. The system of claim 1, wherein the set of functional attributes comprises setting pressure, flow, and temperature on a hydraulic system in he vehicle or setting voltage, current, route information on an electrical system in the vehicle.

11. The system of claim 1, wherein the vehicle is selected from the group consisting of an aircraft, a ship, an automobile, and a train.

12. A network system for generating three dimensional functional space reservation systems of a vehicle using delta storage, comprising:

a plurality of client devices for generating a request for the three dimensional functional space reservation systems of the vehicle;

a plurality of database servers having a plurality of design databases, wherein each of the plurality of design databases stores functional, connectivity and geometrical information associated with two conceptual space reservation versions of the vehicle;

a plurality of application servers for generating the three dimensional functional space reservation systems of the vehicle using delta storage for a computer-aided design (CAD) standard platform based on the functional, connectivity and geometrical information associated with the two conceptual space reservation versions;

a project lifecycle management (PLM) database for storing the generated three dimensional functional space reservation systems;

a functional geometrical information (FGI) reader module for collecting functional, connectivity and geometrical information associated with two conceptual space reservation versions of the vehicle from one or more design databases upon receiving a request from a client device for three dimensional functional space reservation systems, wherein the two conceptual space reservation versions include a current conceptual space reservation version and a previous conceptual space reservation version, wherein the functional, connectivity and geometrical information associated with the two conceptual space reservation versions are transformed into a binary form, and wherein each conceptual space reservation version includes multiple design entities;

a mathematical modeler module for receiving the binary form of the functional, connectivity and geometrical information associated with the two conceptual space reservation versions and creating associated mathematical models in an organized binary form for creating design entities associated with the two conceptual space reservation versions;

a comparator and segregator module for receiving the mathematical models and outputting delta information detected from the two conceptual space reservation versions of the vehicle;

a standardization module for applying a set of rules and checks governing a design of the vehicle to the design entities in the mathematical model of the current conceptual space reservation version and outputting standardized entities information;

a functional mapper module for receiving the delta information from the comparator and segregator module and applying a set of functional attributes to the standardized entities associated with the delta information to create standardized functional entities associated with the delta information; and a writer module for generating the three dimensional functional space reservation systems including new part numbers for the design entities and storing the design entities in the generated three dimensional functional space reservation system of the vehicle for a computer-aided design (CAD) standard platform based on the created standardized functional entities associated with the delta information.

13. The network system of claim 12, wherein the plurality of application servers is configured to return the three dimensional functional space reservation systems of the vehicle to the one of the plurality of client devices in response to the request for three dimensional functional space reservation systems.

14. A computer-implemented method for automatically generating three dimensional functional space reservations systems of a vehicle using delta storage, comprising:
  collecting functional, connectivity and geometrical information associated with two conceptual space reservation versions of the vehicle from one or more design databases upon receiving a request from a client device for three dimensional functional space reservation systems by a file reader tool residing in a computing device, wherein the two conceptual space reservation versions include a current conceptual space reservation version and a previous conceptual space reservation version, wherein the functional, connectivity and geometrical information associated with the two conceptual space reservation versions are transformed into a binary form, and wherein each conceptual space reservation version includes multiple design entities;
  creating mathematical models in an organized binary form for creating design entities associated with the two conceptual space reservation versions by the file reader tool;
  outputting delta information detected from the two conceptual space reservation versions of the vehicle by the file reader tool;
  applying a set of rules and checks governing a design of the vehicle to the design entities in the mathematical model of the current conceptual space reservation version and outputting standardized entities information by the file reader tool;
  applying a set of functional attributes to the standardized entities associated with the delta information to create standardized functional entities associated with the delta information by the file reader tool; and
  generating, by the file reader tool, the three dimensional functional space reservation systems including new part numbers for the design entities and storing the design entities in the generated three dimensional functional space reservation system of the vehicle for a computer-aided design (CAD) standard platform based on the created standardized functional entities associated with the delta information.

15. The method of claim 14, further comprising:
  checking the mathematical model associated with the current conceptual space reservation version for vehicle industry standards and valid entity names, correcting the entities in the mathematical model associated with the current conceptual space reservation version and outputting corrected entities information in the current conceptual space reservation version.

16. The method of claim 15, further comprising:
  reporting out the delta information, corrected entities information and standardized entities information in user understandable information via a GUI interface.

17. The method of claim 14, further comprising separating the design entities based on the delta information.

18. The method of claim 17, further comprising generating the new part numbers for the separated design entities based on the created standardized functional entities associated with the delta information.

19. The method of claim 14, wherein the generating the three dimensional functional space reservation systems comprises generating each object in the three dimensional functional space reservation systems as a three dimensional design entity with at least one functional link to at least one other three dimensional design entity of the three dimensional functional space reservation systems.

20. A non-transitory computer-readable storage medium for automatically generating three dimensional functional space reservations systems of a vehicle using delta storage having instructions that, when executed by a computing device, cause the computing device to perform a method comprising:
  collecting, functional, connectivity and geometrical information associated with two conceptual space reservation versions of the vehicle from one or more design databases upon receiving a request from a client device for three dimensional functional space reservation systems, wherein the two conceptual space reservation versions include a current conceptual space reservation version and a previous conceptual space reservation version, wherein the functional, connectivity and geometrical information associated with the two conceptual space reservation versions are transformed into a binary form, and wherein each conceptual space reservation version includes multiple design entities;
  creating mathematical models in an organized binary form for creating design entities associated with the two conceptual space reservation versions:
  outputting delta information detected from the two conceptual space reservation versions of the vehicle;
  applying a set of rules and checks governing a design of the vehicle to the design entities in the mathematical model of the current conceptual space reservation version and outputting standardized entities information;
  applying a set of functional attributes to the standardized entities associated with the delta information to create standardized functional entities associated with the delta information; and
  generating the three dimensional functional space reservation systems including new part numbers for the design entities and storing the design entities in the generated three dimensional functional space reservation system of the vehicle for a computer-aided design (CAD) standard platform based on the created standardized functional entities associated with the delta information.

* * * * *